United States Patent [19]

Motosugi et al.

[11] 4,262,639

[45] Apr. 21, 1981

[54] INTAKE SYSTEM OF A MULTI-CYLINDER INTERNAL COMBUSTION ENGINE

[75] Inventors: Katsuhiko Motosugi; Shuhei Toyoda; Hiroshi Takahashi; Kazunori Kawabata, all of Toyota, Japan

[73] Assignee: Toyota Jidosha Kogyo Kabushiki Kaisha, Toyota, Japan

[21] Appl. No.: 59,496

[22] Filed: Jul. 23, 1979

[30] Foreign Application Priority Data

Aug. 10, 1978 [JP] Japan ............................. 53/97605

[51] Int. Cl.³ ..................... F02B 29/02; F02B 31/00
[52] U.S. Cl. ........................... 123/52 M; 123/52 MB; 123/188 M; 123/308; 123/432; 123/442; 123/568
[58] Field of Search .............. 123/119 A, 30 C, 52 M, 123/52 MB, 75 B, 188 M

[56] References Cited

U.S. PATENT DOCUMENTS

| | | | |
|---|---|---|---|
| 1,727,265 | 9/1929 | Aseltine | 123/119 R |
| 1,856,736 | 5/1932 | Teeter | 123/52 M |
| 2,028,585 | 1/1936 | Blake et al. | 123/119 R X |
| 2,105,780 | 1/1938 | Davis | 123/52 M |
| 3,364,911 | 1/1968 | Baudry et al. | 123/127 |
| 3,382,856 | 5/1968 | McIlroy | 123/119 R X |
| 3,505,983 | 4/1970 | Hartel | 123/188 M X |
| 4,194,474 | 3/1980 | Endo | 123/75 B X |

*Primary Examiner*—Tony M. Argenbright
*Attorney, Agent, or Firm*—Kenyon & Kenyon

[57] ABSTRACT

A multi-cylinder engine comprising a carburetor housing forming therein at least two branch mixture passages. Each of the branch mixture passages is connected to a respective intake port. A throttle valve of the carburetor is provided for each cylinder. Each of the throttle valves is arranged in the respective branch mixture passage. A common connecting passage and branch connecting passages which are connected to the common connecting passage are provided. Each of the branch connecting passages opens into the respective intake port in the vicinity of the rear face of the valve head of the corresponding intake valve. In addition to the common connecting passage, another common connecting passage and second branch connecting passages, which are connected to the other common connecting passage, are provided. Each of the second branch connecting passages opens into the respective intake port at a position located downstream of the corresponding throttle valve.

21 Claims, 11 Drawing Figures

INTAKE SYSTEM OF A MULTI-CYLINDER INTERNAL COMBUSTION ENGINE

DESCRIPTION OF THE INVENTION

The present invention relates to an intake system of a multi-cylinder internal combustion engine.

Particularly in a gasoline engine, in order to obtain a high output power of the engine by increasing the volumetric efficiency when the engine is operating at a high speed under a heavy load, the shape of an intake port is so constructed that the intake port has as small a flow resistance as possible. In the case wherein the intake port has such a shape, since a considerably strong turbulence is spontaneously created in the combustion chamber of the engine when the engine is operating at a high speed under a heavy load, the burning velocity is sufficiently increased. However, when the same engine is operating at a low speed, a satisfactory strong turbulence is not created in the combustion chamber, thus resulting in a problem in that a sufficient increase in the burning velocity is not obtained.

As a method of creating a strong turbulence in the combustion chamber when an engine is operating at a low speed, there is a method of compulsorily creating a swirl motion in the combustion chamber by using a helically-shaped intake port or by using a shroud valve. However, in the case wherein such a method is adopted, since the flow resistance to which the mixture fed into the cylinder is subjected is increased, a problem occurs in that the volumetric efficiency is reduced when an engine is operating at a high speed under a heavy load. In addition, as an engine capable of creating a strong turbulence in the combustion chamber, the inventor has proposed an internal combustion engine comprising a plurality of throttle valves, each being arranged in the inlet of the respective intake port. In addition, this engine further comprises a plurality of branch connecting passages, each being connected to a single common connecting passage and opening into the respective intake port at a position located downstream of the corresponding throttle valve, for producing a strong turbulence in the combustion chamber by the mixture spouted from the corresponding branch connecting passage at the time of the intake stroke. In this engine, since a positive pressure in the intake port, which is caused by blowing the mixture back into the intake port, is maintained without being attenuated by positioning the throttle valves at the inlets of the intake ports when the engine is operating under a partial load, there is an advantage in that the flow velocity of the mixture spouted from the branch connecting passage can be increased. However, in the case wherein the throttle valves are positioned at the inlets of the intake ports, since intake interference between the cylinders does not occur, the change in the mean value of the vacuum produced in the intake port relative to the change in the opening degree of the throttle valve becomes great as compared with the case wherein the throttle valve is positioned at a position remote from the intake port. The change is the mean value of the vacuum produced in the intake port is indicated by the broken line in FIG. 11. In FIG. 11, the ordinate P indicates the mean value of the vacuum produced in the intake port, and the abscissa $\theta$ indicates the opening degree of the throttle valve. From FIG. 11, it will be understood that, when the opening degree of the throttle valve is slightly changed in the range of the small opening degree $\theta$, the mean value of the vacuum produced in the intake port is greatly changed. In other words, when the opening degree of the throttle valve is slightly changed, the amount of the air fed into the cylinder is greatly changed. Consequently, in the case wherein the mean value of the vacuum produced in the intake port is greatly changed when the opening degree of the throttle valve is slightly changed, a problem occurs in that the output power of an engine cannot be smoothly increased in accordance with the depressing of the accelerator pedal and, at the same time, the operation of an engine becomes unstable when the engine is operating under a light load. As a method of avoiding such a problem, a method of increasing the cross-sectional areas of the common connecting passage and the branch connecting passages has been considered. However, if the cross-sectional areas of the branch connecting passages are increased, it is impossible to spout all of the mixture from the branch connecting passage towards a limited small area and, in addition, the velocity of the mixture spouted from the branch passage is reduced. As a result, it is difficult to create a satisfactory strong swirl motion in the combustion chamber.

An object of the present invention is to provide an intake system of an internal combustion engine, which is capable of smoothly increasing the output power of the engine in accordance with the depressing of the accelerator pedal and which is capable of creating a strong turbulence in the combustion chamber independently of the engine speed when an engine is operating under a light load while ensuring a high volumetric efficiency when the engine is operating at a high speed under a heavy load.

According to the present invention, there is provided a multi-cylinder internal combustion engine having a plurality of cylinders, each having a combustion chamber and an intake valve which has a valve head, said engine comprising: at least one intake passage common to at least two cylinders and comprising a collecting portion having an inlet, and at least two branch intake passages branched off from said collecting portion, each of said branch intake passages being connected to said respective combustion chamber via said corresponding intake valve; fuel supply means arranged in the inlet of said collecting portion; a first common connecting passage; at least two first branch connecting passages each being connected to said first common connecting passage and having an opening which opens into said respective branch intake passage; a second common connecting passage; at least two second branch connecting passages each being connected to said second common connecting passage and having an opening which opens into said respective branch intake passage, and; valve means arranged in said branch intake passages at a position upstream of the openings of said first and said second branch connecting passages and opened in accordance with an increase in the level of the load of said engine.

The present invention may be more fully understood from the description of preferred embodiments of the invention set forth below, together with the accompanying drawings.

DESCRIPTION OF PREFERRED EMBODIMENTS

Figure 1:
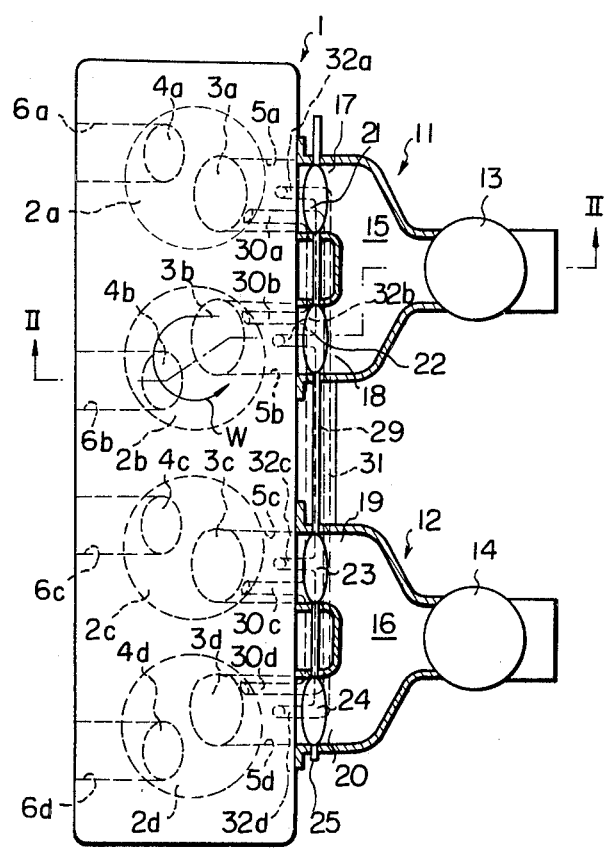
FIG. 1 is a plan view, partly in cross-section, of an embodiment of an engine according to the present invention.
Figure 2:
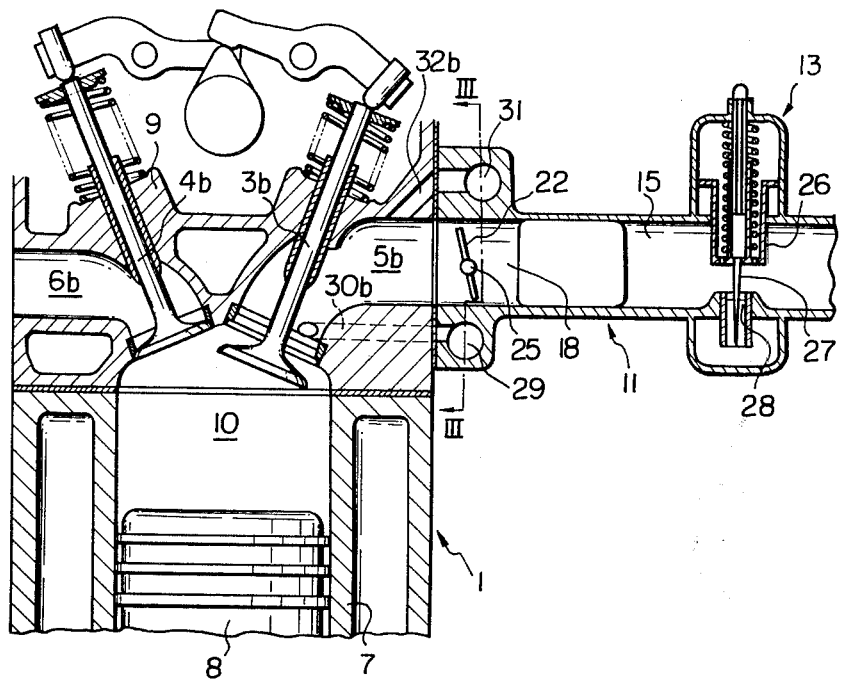
FIG. 2 is a cross-sectional side view taken along the line II—II in FIG. 1.

Referring to FIG. 1, 1 designates an engine body; 2a, 2b, 2c, 2d designate No. 1 cylinder, No. 2 cylinder, No. 3 cylinder and No. 4 cylinder, respectively; 3a, 3b, 3c, 3d designate intake valves; 4a, 4b, 4c, 4d exhaust valves; 5a, 5b, 5c, 5d intake ports; and 6a, 6b, 6c, 6d exhaust ports. Referring to FIG. 2, reference numeral 7 designates a cylinder block, 8 a piston which is reciprocally movable in the cylinder block 7, 9 a cylinder head fixed onto the cylinder block 7, and 10 a combustion chamber. The spark plug (not shown) is arranged in the combustion chamber 10.

Referring to FIGS. 1 and 2, a pair of fuel supply means such as carburetor housings 11, 12 is mounted on the engine body 1, and variable venturi type carburetor bodies 13, 14 are arranged in the carburetor housings 11, 12, respectively. Each of the intake passages such as mixture passages 15, 16 formed in the carburetor housings 11, 12 is divided into four respective branch intake passages such as branch mixture passages 17, 18, 19, 20, and each of the branch mixture passages 17, 18, 19, 20 is respectively connected to the intake ports 5a, 5b, 5c, 5d. Valve means such as throttle valves 21, 22, 23, 24 of the carburetor bodies 13, 14 are arranged in the corresponding branch mixture passages 17, 18, 19, 20 and attached onto a common valve shaft 25. However, instead of being attached onto the common valve shaft 25, the throttle valves 21, 22, 23, 24 may be interconnected to each other by means of a link mechanism (not shown) so that the opening operation of all the throttle valves 21, 22, 23, 24 is controlled at the same time. As is illustrated in FIG. 2, the carburetor body 13 comprises a movable suction piston 26, a movable needle 27 and a metering jet 28. As is well known to those skilled in the art, the suction piston 26 moves up and down so that the vacuum produced in the mixture passage 15 located between the suction piston 26 and the throttle valve 22 is maintained at a constant level.

A first common connecting passage such as channel 29 extending in the longitudinal direction of the engine body 1 and having a cross-sectional area which is smaller than that of the branch mixture passages 17, 18, 19, 20 is arranged beneath the throttle valves 21, 22, 23, 24. In addition, four first branch connecting passages such as channel branches 30a, 30b, 30c, 30d which are in communication with the first common connecting channel 29 and which have a cross-sectional area smaller than that of the branch mixture passages 17, 18, 19, 20 are formed in the cylinder head 9, and the first channel branches 30a, 30b, 30c, 30d open into the intake ports 5a, 5b, 5c, 5d at a position near the rear faces of the valve heads of the corresponding intake valves 3a, 3b, 3c, 3d, respectively. The openings of the first channel branches 30a, 30b, 30c, 30d are directed to valve gaps formed between the corresponding intake valves 3a, 3b, 3c, 3d and their valve seats when the intake valves 3a, 3b, 3c, 3d are opened, respectively. In addition, a second common connecting passage such as channel 31, extending in the longitudinal direction of the engine body 1 and having a cross-sectional area which is smaller than that of the branch mixture passages 17, 18, 19, 20 is arranged above the throttle valves 21, 22, 23, 24. Furthermore, four second branch connecting passages such as channel branches 32a, 32b, 32c, 32d, which are in communication with the second common connecting channel 31 and which have a cross-sectional area smaller than that of the branch mixture passages 17, 18, 19, 20, are formed in the cylinder head 9. As is illustrated in FIG. 2, the openings of the second channel branches 32a, 32b, 32c, 32d are formed on the inner walls of the intake ports 5a, 5b, 5c, 5d at a position located downstream of and near the throttle valves 21, 22, 23, 24, respectively.

Figure 10:
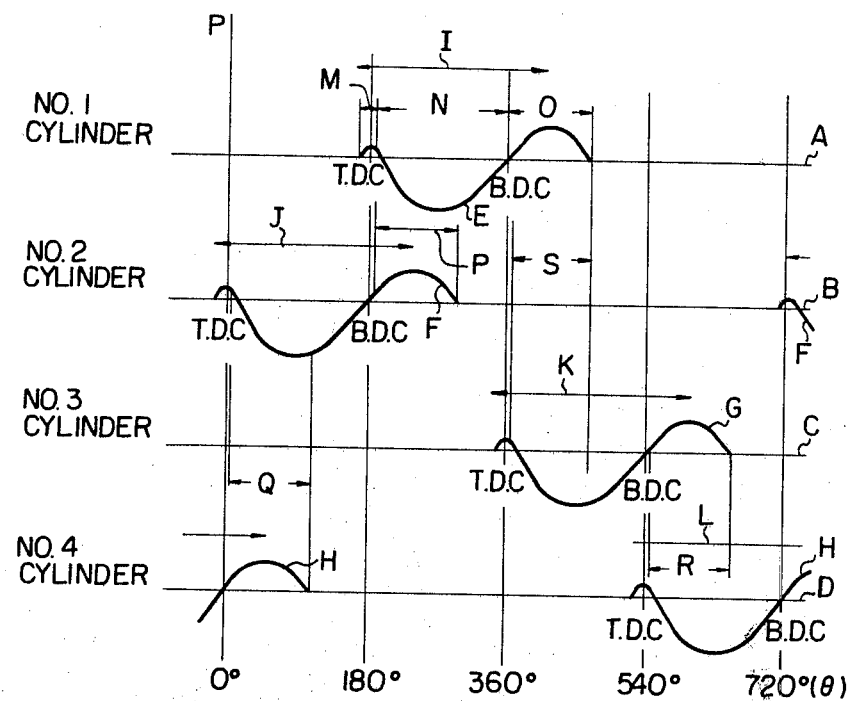
FIG. 10 is a graph showing changes in pressure in the intake port located at a position near the rear face of the valve head of the intake valve.

FIG. 10 illustrates changes in pressure in the intake ports 5a, 5b, 5c, 5d. In FIG. 10, the abscissa $\theta$ indicates a crank angle, and the ordinate P indicates pressure in the intake port in the vicinity of the rear face of the valve head of the intake valve (hereinafter referred to as an intake port pressure). In addition, each of the reference lines A, B, C, D indicates the atmspheric pressure. Furthermore, in FIG. 10, the curved lines E, F, G and H indicate changes in the intake port pressure in the intake ports 5a, 5b, 5c and 5d, respectively, and the arrows I, J, K and L indicate the opening duration of the intake valves 3a, 3b, 3c and 3d, respectively. Referring to the change in pressure in the No. 1 cylinder shown in FIG. 10, the intake port pressure becomes a positive pressure over the range M of the crank angle immediately after the intake valve is opened, and then a vacuum is produced in the intake port of the No. 1 cylinder over the range N of the crank angle in which the piston moves downwards. After this, the intake port pressure again becomes a positive pressure over the range O of the crank angle after the position begins to move upwards. The change in the intake port pressure in the remaining cylinders is the same as that in the intake port pressure in the No. 1 cylinder. Consequently, referring to the range P of the crank angle of the No. 1 cylinder and No. 2 cylinder shown in FIG. 10, it will be understood that a vacuum is produced in the intake port of the No. 1 cylinder, and that, at this time, the intake port pressure of the No. 2 cylinder is positive. In addition, from FIG. 10 it will be understood that, referring to the range Q of the crank angle of the No. 2 cylinder and No. 4 cylinder, a vacuum is produced in the intake port of the No. 2 cylinder and, at this time, the intake port pressure of the No. 4 cylinder is positive; referring to the range R of the crank angle of the No. 3 cylinder and the No. 4 cylinder, a vacuum is produced in the intake port of the No. 4 cylinder and, at this time, the intake port pressure of the No. 3 cylinder is positive; and referring to the range S of the crank angle of the No. 1 cylinder and the No. 3 cylinder, a vacuum is produced in the intake port of the No. 3 cylinder and, at this time, the intake port pressure of the No. 1 cylinder is positive. Consequently, firstly, considering the mixture stream within the first common connecting channel 29 and referring to the No. 1 cylinder and the No. 2 cylinder shown in FIG. 10, it will be understood that, in the first half of the intake stroke of the No. 1 cylinder, the mixture in the intake port 5b of the No. 2 cylinder is fed into the intake port 5a of the No. 1 cylinder via the first channel branch 30b, the first common connecting channel 29 and the first channel branch 30a due to the pressure difference between the vacuum in the intake port 5a and the positive pressure in the intake port 5b. In the same manner as described above, when the No. 2 cylinder is in the intake stroke, the mixture in the intake port 5d of the No. 4 cylinder is fed into the intake port 5b of the No. 2 cylinder via the first channel branch 30d, the first common connecting channel 29 and the first channel branch 30b; when the No. 4 cylinder is in the intake stroke, the mixture in the intake port 5c of the No. 3 cylinder is fed into the intake port 5d of the No. 4 cylinder via the first channel branch 30c, the first common connecting channel 29 and the first channel branch 30d; and when the No. 3 cylinder is in the intake stroke, the mixture in the intake port 5a of the No. 1 cylinder is fed into the intake port 5c of the No. 3 cylinder via the first channel branch 30a, the first common connecting channel 29 and the first channel branch 30c. As mentioned above, due to the pressure difference between the intake port pressures in the intake ports 5a, 5b, 5c, 5d, the mixture is spouted from the first channel branches 30a, 30b, 30c, 30d of the cylinder which is in the intake stroke into the corresponding intake ports 5a, 5b, 5c, 5d at a high speed. In the same manner as described above, due to the pressure difference between the intake port pressures in the intake ports 5a, 5b, 5c, 5d, the mixture is spouted from the second channel branches 32a, 32b, 32c, 32d of the cylinder which is in the intake stroke into the corresponding intake ports 5a, 5b, 5c, 5d at a high speed.

In operation, the mixtures formed in the carburetor bodies 13, 14 are fed into the intake ports 5a, 5b, 5c, 5d via the corresponding mixture passages 15, 16. Assuming that the No. 2 cylinder 2b is now in the intake stroke, the mixture is spouted from the first channel branch 30b and the second channel branch 32b into the intake port 5b at a high speed as mentioned above. At this time, since the opening of the first channel branch 30b is directed to the valve gap formed between the intake valve 3b and its valve seat when the intake valve 3b is opened, the mixture spouted from the first channel branch 30b passes through the above-mentioned valve gap and then flows into the combustion chamber 10 at a high speed. As a result, the mixture flowing into the combustion chamber 10 causes a swirl motion shown by the arrow W in FIG. 1 in the combustion chamber 10. As a result of this swirl motion, a burning velocity is considerably increased and a stable combustion can thus be obtained.

Figure 3:
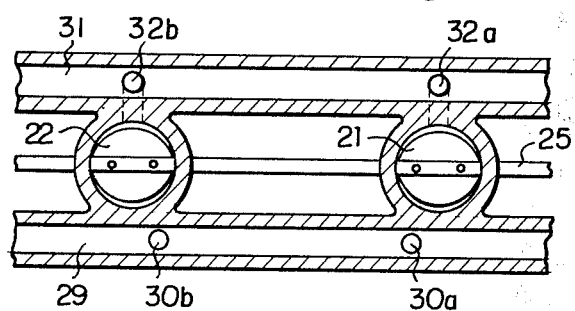
FIG. 3 is a cross-sectional view taken along the line III—III in FIG. 2.
Figure 11:
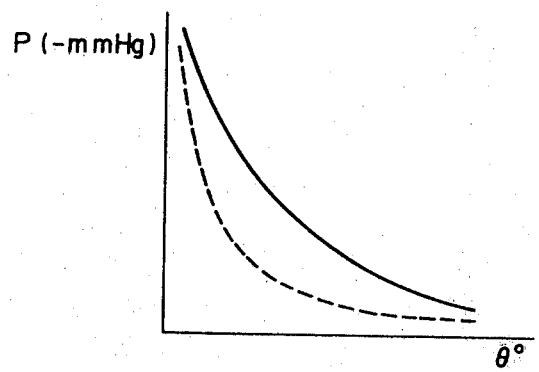
FIG. 11 is a graph showing changes in the mean value of the vacuum produced in the intake port.

As will be understood from FIGS. 2 and 3, since the pressure in a given intake port propagates into the other intake port via the first common connecting passage 29 and the second common connecting passage 21, the pressure in a given intake port has a great influence on the vacuum in the other intake port. As a result, as is illustrated by the solid line in FIG. 11, the change in the mean value of the vacuum produced in the intake port relative to the change in the opening degree of the throttle valve becomes small.

Figure 4:
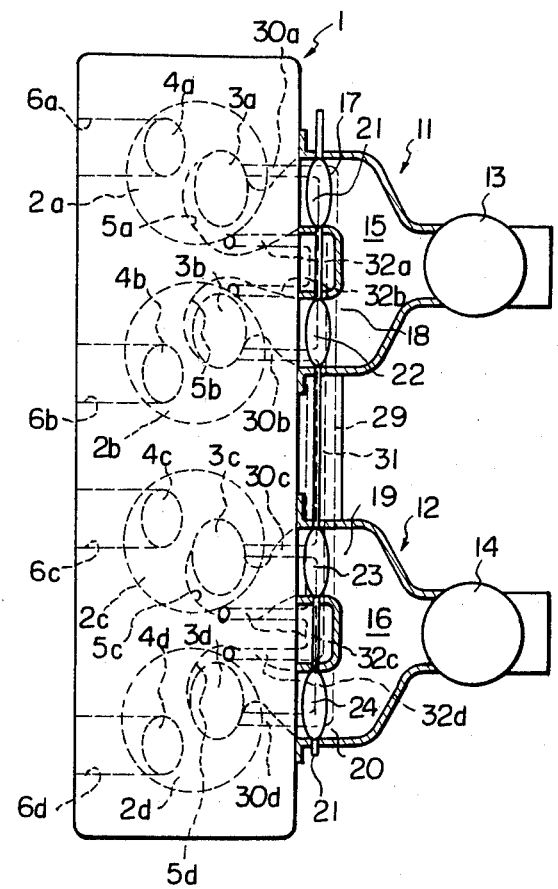
FIG. 4 is a plan view, partly in cross-section, of another embodiment according to the present invention.
Figure 5:
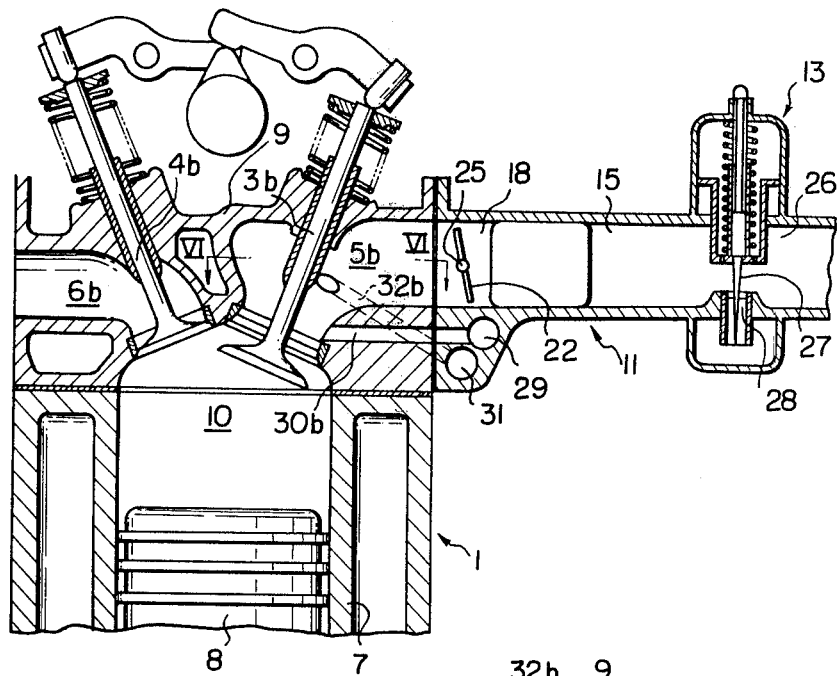
FIG. 5 is a cross-sectional side view of the engine illustrated in FIG. 4.
Figure 6:
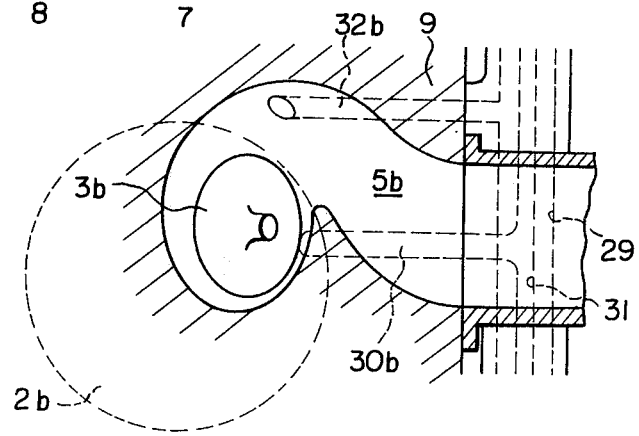
FIg. 6 is a cross-sectional plan view taken along the line VI—VI in FIG. 5.

FIGS. 4 through 6 illustrate another embodiment according to the present invention. In this embodiment, as is illustrated in FIGS. 5 and 6, the second common connecting channel 31 is arranged beneath the throttle valves 21, 22, 23, 24. In addition, each of the intake ports 5a, 5b, 5c, 5d has a helical shape, and the first channel branches 30a, 30b, 30c, 30d and the second channel branches 32a, 32b, 32c, 32d open into the intake ports 5a, 5b, 5c, 5d, respectively. As is illustrated in FIGS. 5 and 6, the opening of the second channel branch 32b is tangentially connected to the inner wall of the helically shaped intake port 5b, which wall extends circumferentially about the axis of the intake valve 3b, and the opening of the first channel branch 30b is formed on the inner wall of the outlet of the helically shaped intake port 5b at a position near the rear face of the valve head of the intake valve 3b. In this embodiment, the flow velocity of the mixture flowing, while swirling, in the helically shaped intake port 5b is increased by the mixture spouted from the second channel branch 32b. In addition, in this embodiment, since a great pressure difference is produced between the intake port pressures in the intake ports even when the engine is operating at a high speed under a heavy load, a large amount of the mixture is spouted from the first channel branch 30b and the second channel branch 32b. Consequently, even if the helically shaped intake port is adopted, there is no danger that the volumetric efficiency will become low when the engine is operating at a high speed under a heavy load.

Figure 7:
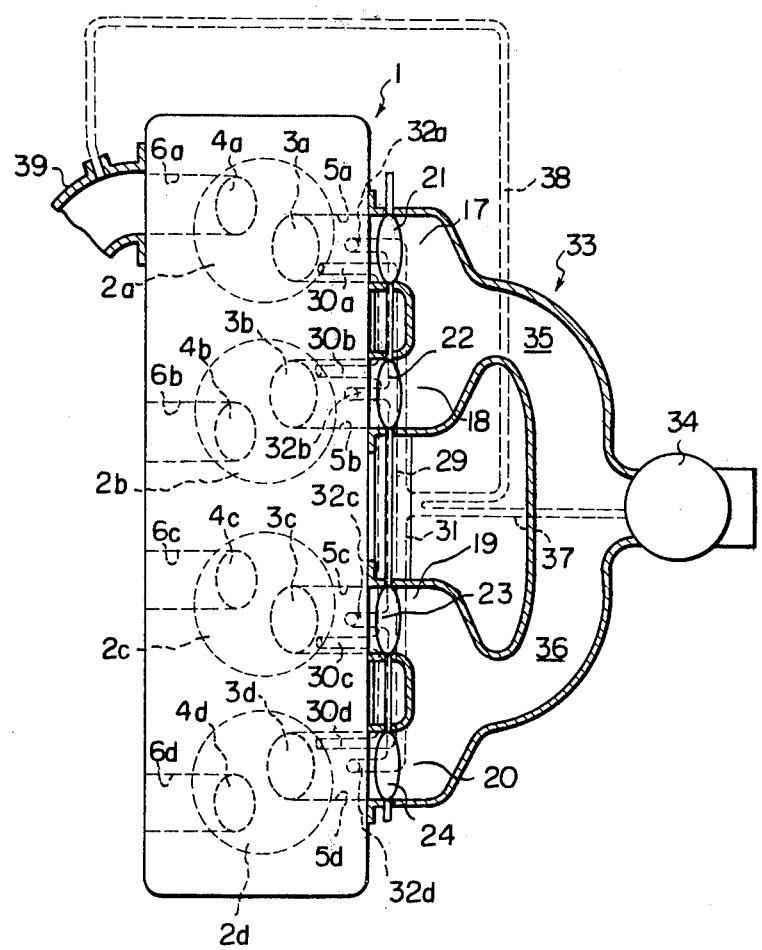
FIG. 7 is a plan view, partly in cross-section, of a further embodiment according to the present invention.

FIG. 7 illustrates a further embodiment according to the present invention. In this embodiment, a single variable venturi type carburetor body 34 having a construction which is the same as that of the carburetor body 13 illustrated in FIG. 2 is arranged in a carburetor housing 33. The outlet passage of the carburetor body 34 is divided into two mixture passages 35, 36, and each of the mixture passages 35, 36 is divided into four respective branch mixture passages 17, 18, 19, 20. Each of the throttle valves 21, 22, 23, 24 is arranged in the respective branch mixture passages 17, 18, 19, 20. In this embodiment, there is an advantage in that the number of the carburetor bodies can be reduced as compared with the case illustrated in FIG. 1. In addition, in this embodiment, the second common connecting channel 31 is connected to the carburetor body 34 via a fuel feed conduit 37, on one hand, and connected to an exhaust manifold 39 via a recirculation exhaust gas (hereinafter referred to as an EGR gas) feed conduit 38, on the other hand. At the time of idling, the fuel for idling is fed into the second common connecting channel 31. Since the mixture is always caused to flow within the second common connecting channel 31, the vaporization of the fuel fed into the second common connecting channel 31 is promoted. In addition, since the fuel fed into the second common connecting channel 31 is uniformly distributed to each cylinder, a stable idling operation of the engine can be ensured. On the other hand, when the EGR gas is fed into the second common connecting channel 31, the EGR gas is uniformly distributed to each cylinder. As a result, a stable combustion can be ensured while reducing the amount of the harmful components in the exhaust gas.

Figure 8:
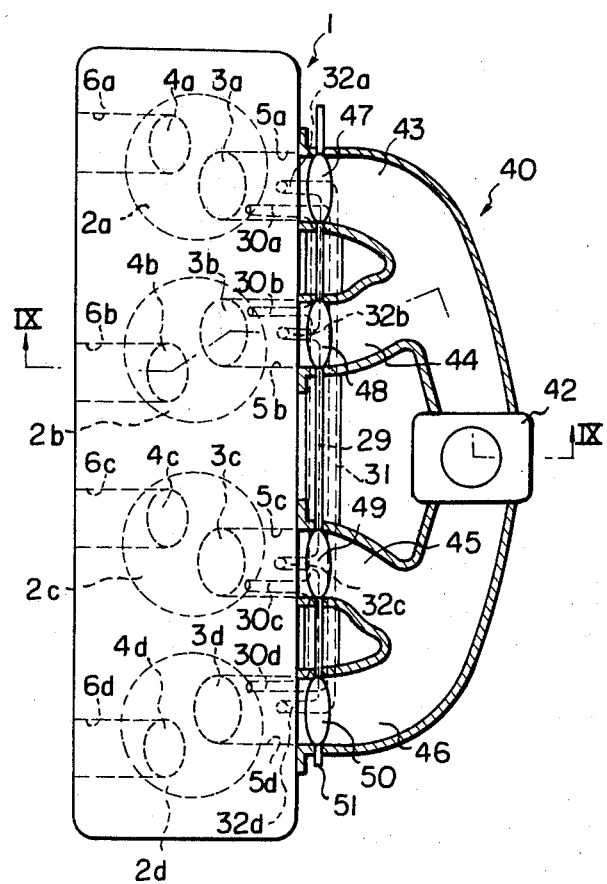
FIG. 8 is a plan view, partly in cross-section, of a still further embodiment according to the present invention.
Figure 9:
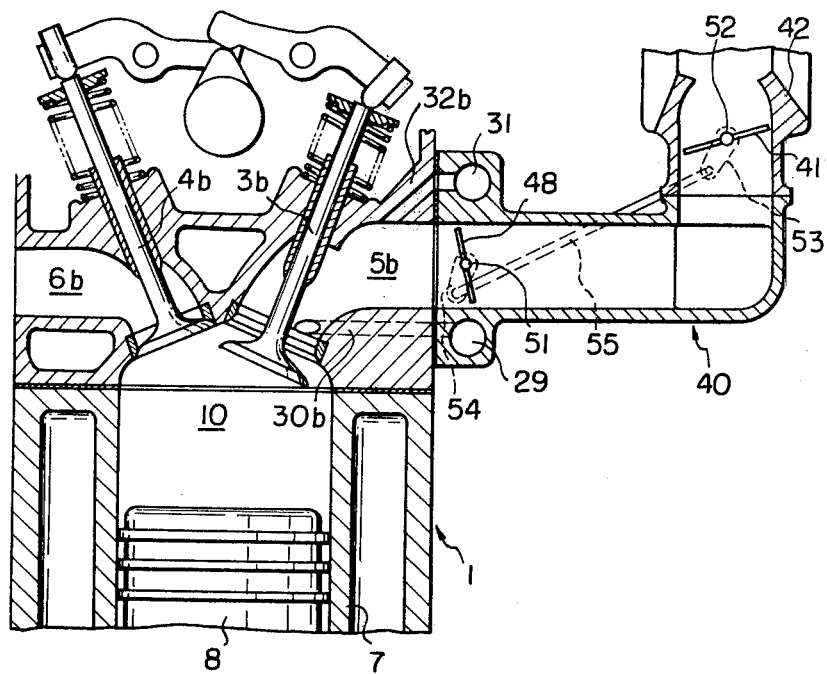
FIG. 9 is a cross-sectional side view taken along the line IX—IX in FIG. 8.

FIGS. 8 and 9 illustrate a still further embodiment according to the present invention. Referring to FIGS. 8 and 9, an intake manifold 40 is fixed onto the engine body 1, and a carburetor 42 having a throttle valve 41 is mounted on the intake manifold 40. The intake manifold 40 comprises manifold branches 43, 44, 45, 46 which are connected to the intake ports 5a, 5b, 5c, 5d, respectively. Secondly throttle valves 47, 48, 49, 50 are arranged in the outlets of the manifold branches 43, 44, 45, 46, respectively, and attached onto a common valve shaft 51. As is illustrated in FIG. 9, an arm 53 attached onto a valve shaft 52 of the throttle valve 41 is interconnected to an arm 54 attached onto the common valve shaft 51 by means of a link 55 so that the secondary throttle valves 47, 48, 49, 50 are gradually opened as the throttle valve 41 is gradually opened. In this embodiment, the changes in pressure produced in the intake port at a position near the rear face of the valve head of the intake valve are as shown in FIG. 10. Consequently, since the mixture is spouted from the first channel branches 30a, 30b, 30c, 30d and the second channel branch 32a, 32b, 32c, 32d into the combustion chamber 10 at a high speed, a strong swirl motion is created in the combustion chamber 10.

As illustrated in FIGS. 1, 2, 4, 5, and 7, by positioning the throttle valves 21, 22, 23, 24 at the outlets of the branch mixture passages 17, 18, 19, 20 and, as illustrated in FIGS. 8 and 9, by positioning the secondary throttle valves 47, 48, 49, 50 at a position near the inlets of the intake ports 5a, 5b, 5c, 5d, the positive pressure which is caused by blowing the mixture back into the intake port is maintained without being attenuated. As a result of this, since the pressure difference between the positive pressure and the vacuum which act on the openings of the first channel branches 30a, 30b, 30c, 30d and the second channel branches 32a, 32b, 32c, 32d is maintained at a large pressure difference for a long time, it is possible to produce an extremely strong swirl motion in the combustion chamber 10. In addition, as mentioned previously, since the mixture flows within the first and the second common connecting channel 29, 31 from the intake port of a given cylinder towards the intake port of the other cylinder, the mixing operation of the mixture is improved and, at the same time, the distribution of fuel to each cylinder becomes uniform.

According to the present invention, by connecting each of the intake ports to the first common connecting channel via the respective first channel branches and to the second common connecting channel via the respective second channel branches, the output of an engine can be smoothly increased in accordance with the depressing of the accelerator pedal. In addition, since it is possible to produce a strong swirl motion in the combustion chamber, the burning velocity can be increased independently of the engine speed when an engine is operating under a light load while ensuring a high volumetric efficiency when the engine is operating at a high speed under a heavy load.

While the invention has been described with reference to specific embodiments chosen for purposes of illustration, it should be apparent that numerous modifications could be made thereto by those skilled in the art without departing from the spirit and scope of the invention.

What is claimed is:

1. A multi-cylinder internal combustion engine having a plurality of cylinders, each having a combustion chamber and an intake valve which has a valve head, said engine comprising:
   at least one intake passage common to at least two cylinders and comprising a collecting portion having an inlet, and at least two branch intake passages branched off from said collecting portion, each of said branch intake passsages being connected to said respective combustion chamber via said corresponding intake valve;
   fuel supply means arranged in the inlet of said collecting portion;
   a first common connecting passage;
   at least two first branch connecting passages each being connected to said first common connecting passage and having an opening which opens into said respective branch intake passage;
   a second common connecting passage;
   at least two second branch connecting passages each being connected to said second common connecting passage and having an opening which opens into said respective branch intake passage, and;
   valve means arranged in said branch intake passages at a position upstream of the openings of said first and said second branch connecting passages and opened in accordance with an increase in the level of the load of said engine.

2. A multi-cylinder internal combustion engine as claimed in claim 1, wherein each of said first common connecting passage has a cross-sectional area which is smaller than that of said branch intake passage.

3. A multi-cylinder internal combustion engine as claimed in claim 1, wherein each of said first branch connecting passages has a cross-sectional area which is smaller than that of said branch intake passage.

4. A multi-cylinder internal combustion engine as claimed in claim 1, wherein said second common connecting passage has a cross-sectional area which is smaller than that of said branch intake passage.

5. A multi-cylinder internal combustion engine as claimed in claim 1, wherein each of said second branch connecting passages has a cross-sectional area which is smaller than that of said branch intake passage.

6. A multi-cylinder internal combustion engine as claimed in claim 1, wherein the opening of each of said first branch connecting passages is arranged in the vicinity of said valve head of said corresponding intake valve.

7. A multi-cylinder internal combustion engine as claimed in claim 4, wherein the opening of each of said first branch connecting passages is directed to a valve gap formed between said corresponding intake valve and a valve seat thereof when said intake valve is opened.

8. A multi-cylinder internal combustion engine as claimed in claim 1, wherein the opening of each of said second branch connecting passages is arranged at a position remote from said valve head of said corresponding intake valve.

9. A multi-cylinder internal combustion engine as claimed in claim 8, wherein the opening of each of said second branch connecting passages is arranged on an upper wall of said respective branch intake passage.

10. A multi-cylinder internal combustion engine as claimed in claim 8, wherein the opening of each of said second branch connecting passages is arranged on a lower wall of said respective branch intake passage.

11. A multi-cylinder internal combustion engine as claimed in claim 8, wherein the opening of each of said second branch connecting passages is tangentially connected to an inner wall of said respective branch intake passage, said wall extending circumferentially about an axis of said corresponding intake valve.

12. A multi-cylinder internal combustion engine as claimed in claim 11, wherein each of said branch passages has a helical shape at a position around said respective intake valve.

13. A multi-cylinder internal combustion engine as claimed in claim 1, wherein said valve means comprises at least two throttle valves, each being arranged in said respective branch intake passage.

14. A multi-cylinder internal combustion engine as claimed in claim 13, wherein said throttle valves are attached onto a common throttle shaft.

15. A multi-cylinder internal combustion engine as claimed in claim 13, wherein each of said throttle valves is arranged at a position near said intake valve.

16. A multi-cylinder internal combustion engine as claimed in claim 15, wherein said engine further comprises at least one carburetor housing forming therein at least two mixture passages each having an outlet which is connected to said respective combustion chamber via said corresponding intake valve, each of said throttle valves being arranged in said outlet of said respective mixture passage.

17. A multi-cylinder internal combustion engine as claimed in claim 1, wherein said engine further comprises another throttle valve arranged in said intake passage, said valve means being operatively connected to said other throttle valve for increasing the opening degree of said valve means in accordance with an increase in the opening degree of said other throttle valve.

18. A multi-cylinder internal combustion engine as claimed in claim 17, wherein said valve means is mechanically connected to said other throttle valve by means of a link mechanism.

19. A multi-cylinder internal combustion engine as claimed in claim 17, said engine further comprises at least one intake manifold having at least two outlets, said valve means comprising at least two throttle valves each being arranged in the respective outlet of said intake manifold.

20. A multi-cylinder internal combustion engine as claimed in claim 1, wherein said second common connecting passage is connected to said fuel supply means for feeding the fuel for idling into said second common connecting passage.

21. A multi-cylinder internal combustion engine as claimed in claim 1, wherein said engine further comprises an exhaust system, said second common connecting passage being connected to said exhaust system for recirculating an exhaust gas into said second common connecting passage.

* * * * *